No. 814,531. PATENTED MAR. 6, 1906.
G. H. GILLETTE.
SEAL FOR BOTTLES.
APPLICATION FILED SEPT. 10, 1901. RENEWED APR. 25, 1904.
2 SHEETS—SHEET 1.
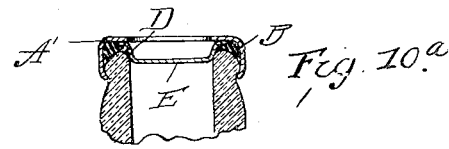
FIG. 1. FIG. 2. FIG. 3.
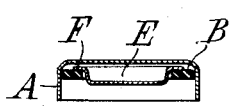 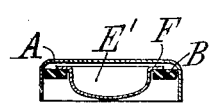
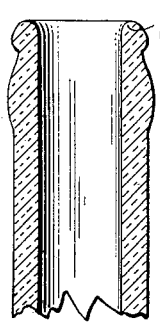 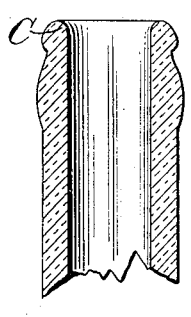 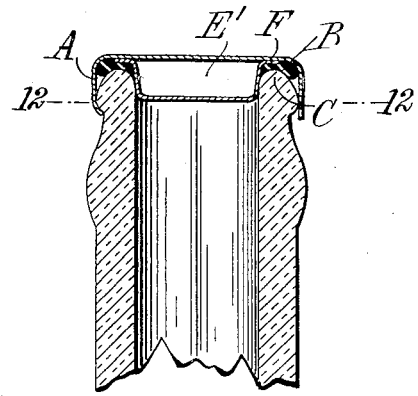
FIG. 4. FIG. 8. FIG. 6.
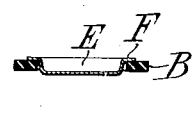 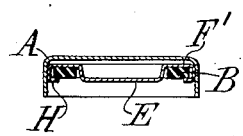 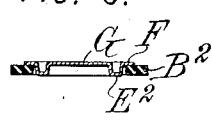
FIG. 5. FIG. 9. FIG. 7.
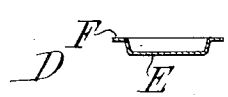 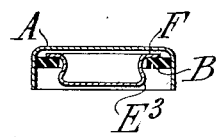 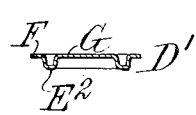
FIG. 10. FIG. 11.
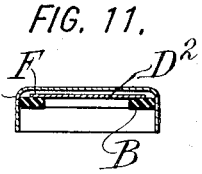
FIG. 12.
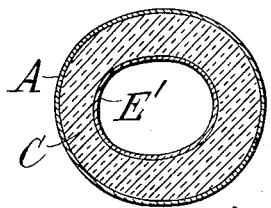
INVENTOR:
George H. Gillette,
By Attorneys,
WITNESSES:

No. 814,531. PATENTED MAR. 6, 1906.
G. H. GILLETTE.
SEAL FOR BOTTLES.
APPLICATION FILED SEPT. 10, 1901. RENEWED APR. 25, 1904.

2 SHEETS—SHEET 2.

WITNESSES:
Fred White
Dominic A. Usina

INVENTOR:
George H. Gillette,
By Attorneys,
Arthur C. Fraser & Co.

UNITED STATES PATENT OFFICE.

GEORGE H. GILLETTE, OF NEW YORK, N. Y., ASSIGNOR TO THE CROWN CORK AND SEAL CO., OF BALTIMORE, MARYLAND, A CORPORATION OF MARYLAND.

SEAL FOR BOTTLES.

No. 814,531.　　　Specification of Letters Patent.　　Patented March 6, 1906.

Application filed September 10, 1901. Renewed April 25, 1904. Serial No. 204,719.

*To all whom it may concern:*

Be it known that I, GEORGE H. GILLETTE, a citizen of the United States, residing in the borough of Manhattan, city, county, and State of New York, have invented certain new and useful Improvements in Seals for Bottles, of which the following is a specification.

My invention provides certain improvements in bottle-seals and in washers for use therein whereby the effectiveness of the seal is increased, it adapts itself easily to irregularities in the mouth of the bottle, the contents are protected from contact with corrosive material, and the cost as compared with equally effective seals of other types is much reduced.

My invention provides also a seal having various other advantages, which are hereinafter specified in detail.

Figure 13:
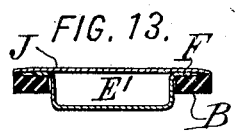
Figure 15:
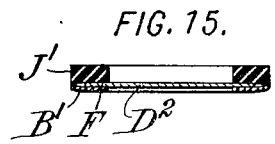
Figure 14:
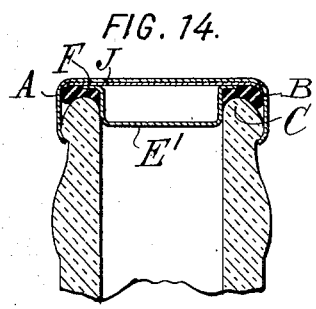
Figure 21:
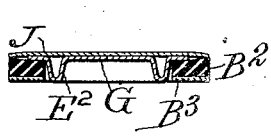
Figure 22:
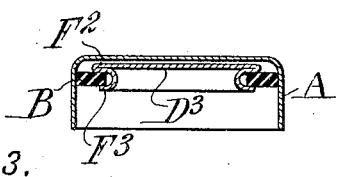
Figure 23:
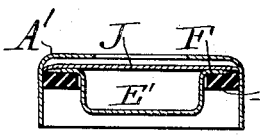

Referring to the accompanying drawings, Figures 1 and 2 are sections of different embodiments of my invention in juxtaposition to a bottle-head to which they are adapted. Fig. 3 is a similar section, on a somewhat larger scale, showing the seal in use. Figs. 4 and 5 are sections of the washer and lining, respectively, of the seal shown in Fig. 1. Figs. 6 and 7 are similar views of another form of washer and lining. Figs. 8, 9, 10, and 11 are further embodiments of my improved seal. Fig. 10ª is a view in section, showing the closure of Fig. 10 applied to the bottle. Fig. 12 is a section on the line 12 12 of Fig. 3, showing the adaptability of my improved seal to bottle-mouths of irregular shape and thickness. Fig. 13 is a section of my improved washer made as a complete article of manufacture, Fig. 14 showing the same in use. Figs. 15 and 16, 17 and 18, and 19 and 20 are similar views of other embodiments of my improved washer. Figs. 21 and 22 are sections of further embodiments of the same. Fig. 23 is a section of my improved washer in connection with a modified cap.

According to one feature of my invention I provide a retaining-cap of the usual or any suitable form, within which I provide a washer, which washer is preferably made with a downwardly-projecting central portion of soft metal adapted to assume the shape of the mouth of a bottle when pressed thereinto and which is also preferably laterally self-adjusting independent of the adjustment of the cap, so as to enable it to center itself on the mouth of the bottle independently of the position of the cap. The independence of the cap and washer is preferably secured by making them in separate pieces. At the same time I am enabled to make the cap of almost any metal and make the washer of a different non-corrosive material, since only the latter comes in contact with the contents of the bottle.

According to another feature of my invention I may make a lining-washer as a complete article of manufacture for use in connection with any suitable means for holding it down, such as the caps above referred to, this washer being preferably non-corrosive and preferably comprising in combination a packing-ring surrounding a central metallic non-corrosive portion adapted to fit the mouth of the bottle closely, so as to keep the contents of the bottle from contact with even the packing-ring, so that the latter only serves to keep the closure air-tight and does not need to be made of material which will resist the chemical action of the contents of the bottle.

Referring now to the drawings, A is a retaining-cap, which may be of any style adapted to be fastened down on the head of a bottle and is shown as an ordinary plane-topped cap having depending flanges which are adapted to be crimped or bent under a shoulder on the outside of the head of the bottle. In connection with the retaining-cap I propose to use a washer which may be made in a variety of forms, of which two are shown in Figs. 4 and 6 separately from the cap. This washer comprises a packing-ring and a member which in every case I call a "lining" and which may assume a variety of shapes and may be connected with the packing-ring in a variety of ways. The lining may be permanently fastened to the packing-ring, so as to form a complete article of manufacture in itself, as by means of cementing material, from the friction of the ring on a central projection of the lining, or in a variety of other ways, some of which will be specified in detail hereinafter, or the lining and the packing-ring, which together form the washer, may be separate from each other, as well as separate from the retaining-cap, being held together only when in actual use on the head of a bottle. In Fig. 1 the packing-ring B is shown as a comparatively broad annular ring of rubber, cork, or other suitable material arranged to extend over the lip C of the bottle. The packing-ring, however, may be of other proportions than those shown. The lining member D, as shown, for example, in Fig. 5, may consist of a central downwardly-projecting portion E, which lies within the packing-ring B, and of a rim F, which extends over the packing-ring B to any desired distance. The ring may fit the projection E so closely as to be held thereon by friction, or it may be cemented to the lining member D either at the projection or at the rim, or it may be fastened thereto in any suitable way or may be, in fact, separate therefrom except when in use. The proportions of the various parts of the lining may be varied considerably, the central portion, for example, projecting more or less into the mouth of the bottle or being entirely flat, as desired. For example, in Fig. 2 the parts are the same as in Fig. 1, except that the projection E' of the lining member is deeper and is adapted to fit the mouth of the bottle closely when forced down into the mouth under pressure. For this purpose the lining member is made of comparatively soft flexible material, and which is preferably also non-corrosive—such, for example, as aluminium. It may, however, be of other material and may be nickeled, japanned, or lacquered to make it non-corrosive. Aluminium is especially adapted to those forms of my invention in which the projection is designed to fit the bottle-mouth closely and form a sort of secondary seal, which is perhaps not as air-tight as rubber or cork, but which is sufficiently tight to keep the contents of the bottle from contact with the packing-ring.

The use of my improved seal in so far as it has been already explained is illustrated in Figs. 3 and 12. The cap A, containing the lining member and packing-ring in proper position, is set on the head of the bottle and pressed down by any suitable mechanism. The packing-ring B is compressed between the cap and the lip of the bottle, the strongest compression coming upon the inner portion of the ring by reason of the rim F of the lining member extending only to about the center of the wall or lip C of the bottle, as shown. The packing is thus compressed very strongly both at the highest point of the lip and at the inner corner of the lip between the vertical wall of the projection of the lining and the horizontal rim of the lining. The parts being held in this position, the cap A has the lower edge of its flange bent under a shoulder on the head of a bottle in the usual way or is fastened down by any other suitable means, thus maintaining an air-tight seal. Where the projection E' of the lining member is designed to enter the mouth of a bottle to a considerable extent, as in Fig. 3, it also presses at the sides tightly against the mouth of the bottle below the packing-ring, so as to protect the latter from contact with the contents of the bottle. By making the washer comprising the lining member and the packing-ring separate from the cap, as shown, the washer will center itself by shifting in the cap, if necessary in order to do this, and by making the lining member of suitable soft metal or the like it adapts itself to any shape of mouth. These are features of my invention which adapt it admirably to use with bottles having irregularities of shape or thickness at the mouth, such as are met with to a large extent in nearly all bottles now manufactured. If the inside of the bottle is not concentric with the outside and the washer were not capable of adjustment relatively to the cap, then there would often result a failure of the seal or a breakage of the bottle in an attempt to press the seal down on it. Similarly, also, if the mouth of the bottle is not a true circle, the member which enters the mouth would not seal equally well at all points in the circumference unless it were made of soft material capable of being distorted to assume the exact shape of the mouth of the bottle. For example, in Fig. 12, C shows the wall of a bottle having a non-circular mouth and having also a glass much thicker at one side than at the other. The washer of my improved seal, however, has easily shifted out of center with the cap, so as to locate itself properly in the opening, and has also assumed the non-circular shape of the mouth, so as to fit it closely at all points. It is understood that any suitable style of cap may be used with my improved washer; but it will be found advantageous to use the plane cap with depending flanges illustrated, as any irregularities in the shape thereof render it stiff and interfere to some extent with its adapting itself to irregularly-shaped bottle-mouths.

An advantage of the construction of seal described is the protection of the cap from the action of the contents of the bottle, and where a sufficiently deep projection is used the protection also of the packing-ring. A further advantage in the use of a plane cap with a separate washer is the facility of decoration of the cap, which is commercially a valuable feature.

As explained above, the several elements of the seal may be modified in a variety of ways without departing from the essential features of the invention. For example, in Fig. 6 the projection $E^2$ of the lining member is of annular shape, the center G of the lining member being in the same plane with the rim F. The lining member in this construction is shown separately in Fig. 7. The packing-ring is attached to this lining member in any suitable way or may be separate therefrom.

In Fig. 8 the lining member has a projection E the same as in Fig. 1, but its rim F' is extended entirely over the packing-ring B and is bent around it, as at H, to retain it in connection with the lining member. In Fig. 9 the same object (the retention of the packing-ring B) is accomplished by the use of a projection E³, which is larger below the packing-ring than at its upper end, where the packing-ring lies.

In Fig. 10 the washer is shown the same as in Fig. 1, but the cap A' is modified by cutting out the center, thereby utilizing the lining not only to prevent corrosion of the cap by contact with the contents of the bottle, but to retain the pressure within the bottle as if it were part of the cap. This form of cap of course may be used with any of the washers shown.

In Fig. 11 the lining member D² has a flat center and no projecting portion.

Figure 16:
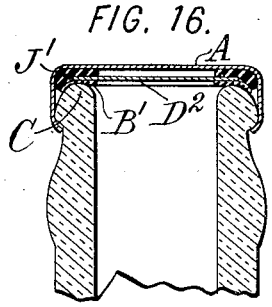
Figure 17:
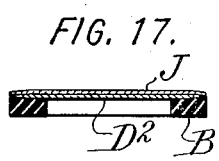

In the construction shown in Figs. 13 to 23 I provide a washer having, in addition to the advantages specified for the embodiments of my invention previously described, certain advantages in manufacture and use which will be specified in detail. In these forms of the invention the lining member is connected with the packing-ring so as to form in connection therewith a complete article of manufacture adapted for use with various caps or other retaining devices. Preferably, also, this improved washer is made to possess the same features of advantage as those above described in detail. For example, in Fig. 13 my improved washer comprises a packing-ring B, of rubber, cork, or the like, and a lining member comprising a projecting portion E', similar to the corresponding portion in Figs. 2 and 3, and a rim F, the packing-ring being attached to the lining member. The attachment is preferably obtained by a strip of linen, paper, or other suitable fabric J, which rests on top of the rim of the lining member and extends beyond the same, where it is cemented or otherwise fastened to the projecting portion of the packing-ring B, thus holding the packing-ring and lining member together. By the use of the deep projection E' the packing-ring is protected from contact with the contents of the bottle the same as in Fig. 3, and the packing-ring may therefore be made of any cheap substitute for rubber or cork, since it is only necessary that it be air-tight under pressure. Fig. 14 shows the washer of Fig. 13 held in place by a retaining-cap A of the usual design, the action of the parts being substantially identical with the action of the corresponding parts shown in Fig. 3.

Where additional means are used for attaching the packing-ring to the lining member, it is not necessary that there be a projecting portion of the lining member to hold the packing-ring in position. For example, in Figs. 15 and 16 the lining member D² is a flat disk having its rim F extending partly over the packing-ring B' and fastened thereto in any suitable manner. Preferably the mode of attachment is similar to that shown in Fig. 13; but instead of the material and proportions shown therein I may make my packing-ring B' of a thin piece of the best quality packing and may use as the fabric on the other side of the lining member a thick ring J' of cheaper packing material. By this means, as shown in Fig. 16, at the point C, at which the actual sealing occurs, only the highest quality of packing B' is used, and the seal is consequently perfect; but the necessary elasticity of the pressure is secured by means of the cheaper packing fabric J' on the other side of the lining member D² and between such lining member and the cap A, through which the pressure is exerted.

Figure 19:
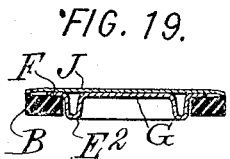
Figure 18:
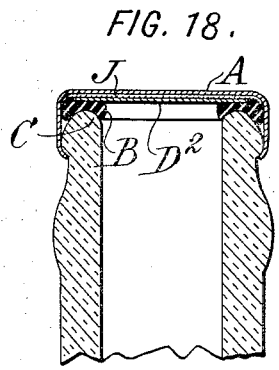
Figure 20:
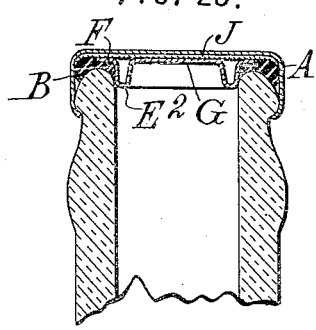

I may of course omit the central projecting portion of the lining when using any desired form of ring. For example, in Figs. 17 and 18 I use a packing-ring B and lining member D² with a flat central portion connected by a fabric J, the same as in Fig. 13. The action is the same as the action of the construction shown in Fig. 13, except for the loss of the function of the depending projection E' of said figure. I may also substitute for the depending portion E' of Fig. 13 an annular depending portion E², as shown in Fig. 19, the packing-ring B, rim F, and fabric J being arranged in substantially the same way as in Fig. 13 and with substantially the same effect. I propose also as within my invention to modify the packing-ring B of the previous figures by substituting therefor, as shown in Fig. 21, a ring B² of cheaper packing material, combined with a facing B³ of the best material, these two parts being cemented together, so as to form substantially an integral ring, and being utilized just as the ring B is in any of the previous figures. I may also use a lining member D³ which is flat at the center, as shown in Fig. 22, and which has a rim F², which extends the desired distance over the packing-ring B and is then bent backward, as shown, to receive the packing-ring, and bent outward, as at F³, on the under side of the packing-ring, so as to hold it in connection with the lining member. In connection with any form of my complete washer I may also use the cap A', (shown in Fig. 23,) which is open at the center, it being obvious that the lining member acts as a seal and that the cap is merely a retaining device.

Various other modifications in the details and arrangement of the parts may be made by those skilled in the art without departure from the essential principles of my invention.

In Fig. 10 the cement mentioned above for securing the packing to the member E is indicated at $b^\times$.

What I claim is—

1. The combination with a metallic external retaining-cap, of a metallic lining of different metal from that of said cap, said cap having a plain depending flange and being of soft metal whereby it may be bent under and in direct unyielding contact with a projecting shoulder on the head of the bottle at any point to which the cap may be pressed down.

2. The combination with an external retaining-cap, of an aluminium lining therefor, said cap having a plain depending flange and being of soft metal whereby it may be bent under and in direct unyielding contact with a projecting shoulder on the head of the bottle at any point to which the cap may be pressed down.

3. The combination with a retaining-cap of a lining therefor having before use a downwardly-projecting central portion of soft metal adapted in use to fit and to assume the shape of the mouth of a bottle when pressed downward thereinto, said cap having a plain depending flange and being of soft metal whereby it may be bent under and in direct unyielding contact with a projecting shoulder on the head of the bottle at any point to which the cap may be pressed down.

4. The combination with a retaining-cap of a lining therefor having before use a downwardly-projecting central portion of aluminium adapted in use to fit and to assume the shape of the mouth of a bottle when pressed downward thereinto, said cap having a plain depending flange and being of soft metal whereby it may be bent under and in direct unyielding contact with a projecting shoulder on the head of the bottle at any point to which the cap may be pressed down.

5. The combination with an external retaining-cap, of a lining adapted before use to move laterally of said cap and to enter into and center itself upon the mouth of the bottle independently of the lateral position of the retaining-cap, said cap having a plain depending flange and being of soft metal whereby it may be bent under and in direct unyielding contact with a projecting shoulder on the head of the bottle at any point to which the cap may be pressed down.

6. The combination with an external retaining-cap, of a lining adapted before use to move laterally of said cap and having before use a downwardly-projecting central portion of soft metal adapted in use to fit and to assume the shape of the mouth of a bottle when pressed downward thereinto, said cap having a plain depending flange and being of soft metal whereby it may be bent under and in direct unyielding contact with a projecting shoulder on the head of the bottle at any point to which the cap may be pressed down.

7. The combination with a bottle of a retaining-cap, and a lining within said cap having a downwardly-projecting central portion of soft metal fitting the mouth of said bottle, said cap having a plain depending flange and being of soft metal whereby it may be bent under and in direct unyielding contact with a projecting shoulder on the head of the bottle at any point to which the cap may be pressed down.

8. The combination with an external retaining-cap, of a washer comprising a lining and a packing-ring fastened together, said washer being movable laterally of said cap so as to center itself on the mouth of a bottle independently of the lateral position of the retaining-cap, said cap having a plain depending flange and being of soft metal whereby it may be bent under and in direct unyielding contact with a projecting shoulder on the head of the bottle at any point to which the cap may be pressed down.

9. The combination with an external retaining-cap, of a washer comprising a lining and a packing-ring fastened together, and adapted before use to enter into and center itself upon the mouth of a bottle independently of the lateral position of the retaining-cap, said cap having a plain depending flange and being of soft metal whereby it may be bent under and in direct unyielding contact with a projecting shoulder on the head of the bottle at any point to which the cap may be pressed down.

10. The combination with an external retaining-cap, of an annular packing-ring, and a lining member adapted to be clamped between the top of the cap and the packing-ring and to bear upon the packing-ring alone, said cap having a plain depending flange and being of soft metal whereby it may be bent under and in direct unyielding contact with a projecting shoulder on the head of the bottle at any point to which the cap may be pressed down.

11. The combination with an external retaining-cap, of an annular packing-ring, and a lining member adapted to be clamped between the top of the cap and the packing-ring and to bear upon the packing-ring alone, said lining member being movable independently of the cap so as to center itself over the mouth of a bottle independently of the lateral position of the cap, said cap having a plain depending flange and being of soft metal whereby it may be bent under and in direct unyielding contact with a projecting shoulder on the head of the bottle at any point to which the cap may be pressed down.

12. The combination with an external retaining-cap, of an annular packing-ring and a lining member D having a central downwardly-projecting portion E lying within the packing-ring, and a rim F adapted to be clamped between the top of the cap and the packing-ring and to bear upon the packing-ring alone, said cap having a plain depending flange and being of soft metal whereby it may be bent under and in direct unyielding contact with a projecting shoulder on the head of the bottle at any point to which the cap may be pressed down.

13. In a receptacle-closure, the combination of a gasket fitting over the top edge of a receptacle and provided with an opening, a protecting device comprising a depressed portion and an outwardly-extending flat portion, the latter fitting over the gasket and compressing said gasket against the top edge of the receptacle-mouth, and the depressed portion of the protecting device fitting in the opening of the gasket and entering the mouth of the receptacle and held in wedging contact with the interior wall of the receptacle-mouth, the said protecting device being composed of a material which is impervious to and which will not deleteriously affect the liquid contents of the receptacle, a cap fitting over the gasket and the protecting device and over the receptacle-mouth, and means for holding said cap in place over the bottle-mouth.

14. A bottle-closure comprising a member having an opening in its top and a depending flange to lie on the exterior of the bottle, a second member closing the opening in the top of the first member and being of soft non-corrosive material which is exposed at said opening and which, when the cap is applied to the bottle bears against a portion thereof at the mouth, and a permanently-attached gasket within the closure, said flange being adapted to be bent into locking engagement with an exterior shoulder on the bottle at any point to which the closure may be forced down.

15. A closure for bottles comprising a member having a portion to extend down on the outer side of the bottle to have holding engagement therewith, a gasket to fit over the top edge of the bottle-mouth, a cup-shaped member fitting in the opening of the gasket and adapted to extend into the mouth of the bottle to contact with the inner wall of said mouth, said gasket being permanently attached to the cup-shaped member, substantially as described.

16. In combination with a bottle having a lip rounded on its side and inner edge, a sealing member having a portion extending into the bottle-mouth and substantially tangential to the said rounded inner edge forming a crevice contracting toward the bottle-mouth, and a packing resting on the bottle-lip and underlying and pressed upon by a portion of the said sealing member, and a part to be locked to the exterior of the bottle, substantially as described.

17. The combination in a closure of a member consisting of a retaining-cap, a second member providing a downwardly-projecting central portion of soft metal adapted in use to fit and assume the shape of the bottle when pressed down into engagement therewith and a permanently-carried gasket within the cap, said cap being flanged for engagement with a shoulder on the exterior of the bottle when it is bent thereunder, substantially as described.

18. The combination in a closure of a member consisting of a retaining-cap, a second member providing a downwardly-projecting portion adapted to have lateral movement in respect to the cap to adjust itself to the bottle and being of soft metal to conform under pressure to any irregularities in the portion of the bottle with which it contacts, and a yielding gasket carried within the cap, substantially as described.

In witness whereof I have hereunto signed my name in the presence of two subscribing witnesses.

GEORGE H. GILLETTE.

Witnesses:
 DOMINGO A. USINA,
 FRED WHITE.